(12) United States Patent
Lebowsky et al.

(10) Patent No.: US 7,860,338 B2
(45) Date of Patent: Dec. 28, 2010

(54) METHOD OF PROCESSING, FOR EXAMPLE OF INSERTING CONTOURS OF A DIGITAL IMAGE AND CORRESPONDING DEVICE

(75) Inventors: Fritz Lebowsky, Saint Martin D'Uriage (FR); Yong Huang, Singapore (SG); Haiyun Wang, Singapore (SG)

(73) Assignees: STMicroelectronics SA, Montrouge (FR); STMicroelectronics Asia Pacific Pte Ltd., Singapore (SG)

( * ) Notice: Subject to any disclaimer, the term of this patent is extended or adjusted under 35 U.S.C. 154(b) by 984 days.

(21) Appl. No.: 11/623,504

(22) Filed: Jan. 16, 2007

(65) Prior Publication Data

US 2007/0230783 A1 Oct. 4, 2007

(30) Foreign Application Priority Data

Jan. 17, 2006 (FR) .................................. 06 00415

(51) Int. Cl.
*G06K 9/40* (2006.01)
*G06K 9/48* (2006.01)

(52) U.S. Cl. ....................... 382/266; 382/199

(58) Field of Classification Search ................. 382/199, 382/298, 254, 263, 266; 348/561, 581, 704; 358/451

See application file for complete search history.

(56) References Cited

U.S. PATENT DOCUMENTS

| 4,654,711 | A | | 3/1987 | Mikado ....................... 358/180 |
| 4,800,379 | A | * | 1/1989 | Yeomans ..................... 345/661 |
| 5,305,398 | A | | 4/1994 | Klein et al. ................... 382/47 |
| 6,034,654 | A | * | 3/2000 | Zorzan et al. ................. 345/60 |
| 6,091,513 | A | * | 7/2000 | Ishihara et al. ............... 358/1.9 |
| 2003/0020733 | A1 | * | 1/2003 | Yin ............................ 345/660 |
| 2003/0039409 | A1 | | 2/2003 | Ueda .......................... 382/298 |
| 2004/0179750 | A1 | * | 9/2004 | Kumakura ................... 382/291 |
| 2005/0226525 | A1 | * | 10/2005 | Kuraki et al. ................ 382/261 |

* cited by examiner

*Primary Examiner*—Daniel G Mariam
(74) *Attorney, Agent, or Firm*—Lisa K. Jorgenson; Allen, Dyer, Doppelt, Milbrath & Gilchrist, P.A.

(57) ABSTRACT

A device processes an initial digital image with at least one contour zone. The device may have a magnifier able to magnify the initial image into a magnified digital image. The magnifier may have a detector able to detect the contour zones of the initial digital image, a determinater able to determine the size, in terms of number of pixels, of each contour zone, and a second magnifier able to magnify each contour zone using of a software tool, chosen as a function of the size of each contour zone, from among a set of magnifying software tools.

21 Claims, 11 Drawing Sheets

| | CA(min) | CA(n) | CA(n)1 | CA(n)2 | CA(max) |
|---|---|---|---|---|---|
| step 2 | 0 | | 0.65 | | 1 |
| step 3 gain = 3 | 0 | 1.95 | | | 1 |
| step 4→8 m = 1 | 0 | 1.95 | 1 | | 1 |
| step 5→8 m = 2 | 0 | 1.95 | 1 | 0 | 1 |
| step 9 | 0 | 0.95 | 1 | 0 | 1 |
| step 10 | 0 | 0 | 0.95 | 1 | 1 |

FIG.9

| | CA(max) | CA(n) | CA(n)1 | CA(n)2 | CA(n+1) | CA(n+1)1 | CA(n+1)2 | CA(min) |
|---|---|---|---|---|---|---|---|---|
| step 2 | 1 | | 0.85 | | | 0.35 | | 0 |
| step 3 gain = 3 | 1 | 2.55 | | | | | | 0 |
| step 4→8 m = 1 | 1 | 2.55 | 1 | | 1.05 | 1 | | 0 |
| step 5→8 m = 2 | 1 | 2.55 | 1 | 1 | 1.05 | 1 | 0 | 0 |
| step 9 | 1 | 0.55 | 1 | 1 | 0.05 | 1 | 0 | 0 |
| step 10 | 1 | 1 | 1 | 1 | 0.55 | 0.05 | 0 | 0 |

FIG.11

| | CA(max) | CA(n) | CA(n)1 | CA(n)2 | CA(n+1) | CA(n+1)1 | CA(n+1)2 | CA(min) |
|---|---|---|---|---|---|---|---|---|
| step 2 | 1 | | 0.85 | | | 0.35 | | 0 |
| step 3 gain = 3 | 1 | 3.6 | | | | | | 0 |
| step 4→8 m = 1,2 | 1 | 3.6 | 1 | 1 | | | | 0 |
| step 5→8 m = 3,4,5 | 1 | 3.6 | 1 | 1 | 1 | 0 | 0 | 0 |
| step 9 | 1 | 0.6 | 1 | 1 | 1 | 0 | 0 | 0 |
| step 10 | 1 | 1 | 1 | 1 | 0.6 | 0 | 0 | 0 |

FIG.12

| | CA(max) | CA(n) | CA(n+1) | CA(min) |
|---|---|---|---|---|
| step 2 | 1 | 0.85 | 0.35 | 0 |
| step 3 gain = 1 | 1 | 1.2 | | 0 |
| step 4→8 | 1 | 1.2 | 1 | 0 |
| step 9 | 1 | 0.2 | 1 | 0 |
| step 10 | 1 | 1 | 0.2 | 0 |

FIG. 13

METHOD OF PROCESSING, FOR EXAMPLE OF INSERTING CONTOURS OF A DIGITAL IMAGE AND CORRESPONDING DEVICE

FIELD OF THE INVENTION

The invention relates to the processing of digital images, in particular the processing of the contour zones of a digital image that has undergone a transformation, for example a magnification.

BACKGROUND OF THE INVENTION

Conventionally, the image minus contour is processed as a whole, and in parallel a processing of the horizontal and vertical contours is performed for a two-dimensional image. On completion of each processing, identical for all the contours, the latter are inserted into the image according to a conventional linear procedure.

Generally the latter employs a mixer between the vertical and horizontal processed contours obtained, according to the orientation of this contour in the image, and the resulting contour is inserted directly at its position in the image. This procedure is for example described in the article: Xin Li, Michael T. Orchard: New edge directed interpolation; IEEE Trans, On Image Processing, Vol. 10, No. 10, pp. 1521-1527, 2001.

A post-filtering may moreover be performed to rectify the artifacts that may have appeared on completion of the transformation of the image. However, if the contour processing used can reduce certain artifacts appearing during the transformation of the image, for example, the appearance of halos at the level of the contours of the image, it may aggravate other phenomena, such as the appearance of oscillations ("ringing") which may be particularly detrimental for certain applications.

SUMMARY OF THE INVENTION

An object of the invention is to be able to obtain an image having sharp contour zones, regardless of the application chosen by the user, without performing additional post-filtering. Another object of the invention is to process the image as a whole in a manner optimal for the application chosen by the user.

For this purpose, there is proposed a method of processing an initial digital image comprising at least one contour zone, the method comprising a phase of transformation, for example of magnification of the initial image into a transformed digital image, for example magnified.

The transformation of each contour zone is performed with a method of magnification, for example a transformation algorithm or procedure, chosen as a function of the size of the contour zone from a set of predetermined methods of magnification. More particularly, there is proposed a method of processing an initial digital image comprising contour zones, the method comprising a phase of transforming the initial image into a magnified digital image.

Thus, it is possible to decide, as a function of the size of the contour, to apply to this contour a method of transformation identical to that applied to the remainder of the image. It is also possible to decide to apply to this contour a different method of transformation from that applied to the remainder of the image.

Additionally, it is also possible to choose a software transformation tool, from a set of predetermined software tools, to apply a transformation processing, for example of magnification, to a zone of the image other than a contour zone. The choice may also be made as a function of the size, for example in terms of number of pixels, of the said image zone. The size may also vary according to the dimension considered of the multidimensional image. Thus, an image zone different from a contour zone will be likened to a "negative" contour zone. This applies also to an image free of any contour zone. In this case, the whole of the image will nevertheless be likened to a single "negative" contour zone.

According to another aspect there is thus proposed a method of processing an image, comprising a detection of the size of the zones of this image, for example one or more contour zones and one or more non-contour or "negative" contour zones (possibly corresponding to the image as a whole, if the latter does not comprise any contour zone), and a transformation of the image by applying a transformation tool or several transformation tools chosen as a function of the size of the image or of the respective sizes of the various zones, from a set of predetermined tools.

There is also proposed a device for processing an image, comprising means of detection or a detector able to perform a detection of the size of the zones of this image, for example one or more contour zones and one or more non-contour or "negative" contour zones (possibly corresponding to the image as a whole, if the latter does not comprise any contour zone), and means of transformation able to perform a transformation of the image by applying a transformation tool or several transformation tools selected as a function of the size of the image or of the respective sizes of the various zones, from a set of predetermined tools.

The magnifying phase comprises a step of detection where the contour zones of the initial digital image are detected, a step of determination where the size, in terms of number of pixels, of each contour zone is determined, and a step of magnifying each contour zone with the aid of a software tool, chosen as a function of the size of each contour zone, from among a set of magnifying software tools.

The software tool chosen for the step of magnifying the contours may provide a contour zone sharpness processing, which comprises a conversion of the cues regarding level of pixels of the contour zone into initial main cues, lying between a minimum value, for example 0, and a main value dependent on the amplitude of the contour, a sharpness sub-processing performed on these initial main cues so as to obtain final main cues, and a conversion of the final main cues into final cues regarding levels.

According to an embodiment, the main value corresponds to the amplitude of the contour, that is to say to the deviation between the maximum amplitude of a pixel and the minimum amplitude of another pixel. This embodiment has the advantage of limiting the number of operations to be performed. The main cue may be normalized, and may correspond to the contour amplitude divided by this same amplitude. The main cue therefore has a unit value. The method may comprise a step of post-filtering of the contour zones of the magnified image, according to a post-filtering software tool, chosen as a function of the dimensions of each contour zone.

Furthermore, it may be possible to detect the direction of variation of the pixels of each contour zone, and to choose the post-filtering software tool as a function of the direction of variation also. It may be possible to choose the magnifying software tool as a function of the direction of variation also. It may be possible to determine the size of the contour zones according to n dimensions.

In particular, it may be possible to determine the size of the contour zones according to two dimensions, respectively according to the horizontal axis and the vertical axis. The method may also comprise a step of displaying the magnified digital image on a screen, in particular a plasma screen.

According to another aspect, there is proposed a device for processing an initial digital image comprising at least one contour zone, the device comprising means of transformation, for example, of magnification able to transform the initial image into a transformed digital image, for example magnified.

The means of transformation or transformer is able to magnify each contour zone according to a method of magnification, for example a magnification algorithm or procedure, chosen as a function of the size of the contour zone from among a set of predetermined methods of magnification.

More particularly, the magnifying means or magnifier may comprise means of detection or a detector able to detect the contour zones of the initial digital image, means of determination able to determine the size, in terms of number of pixels, of each contour zone, and magnifying means able to magnify each contour zone with the aid of a software tool, chosen as a function of the size of each contour zone, from among a set of magnifying software tools.

The magnifying means or magnifier comprises sharpness processing means or a sharpness processor which comprises first conversion means or a first converter able to convert cues regarding the level of pixels of the contour zone into initial main cues, lying between 0 and 1, means of sharpness sub-processing able to perform a sharpness processing on these initial main cues so as to obtain final main cues, and second conversion means or a second convertor able to convert the final main cues into final cues regarding levels. According to another aspect, there is proposed a display system, in particular a plasma screen, comprising a device as defined hereinabove.

BRIEF DESCRIPTION OF THE DRAWINGS

Other advantages and characteristics of the invention will become apparent on examining the detailed description of an embodiment of the invention which is in no way limiting and the appended drawings in which.

DETAILED DESCRIPTION OF THE PREFERRED EMBODIMENTS

Figure 1:
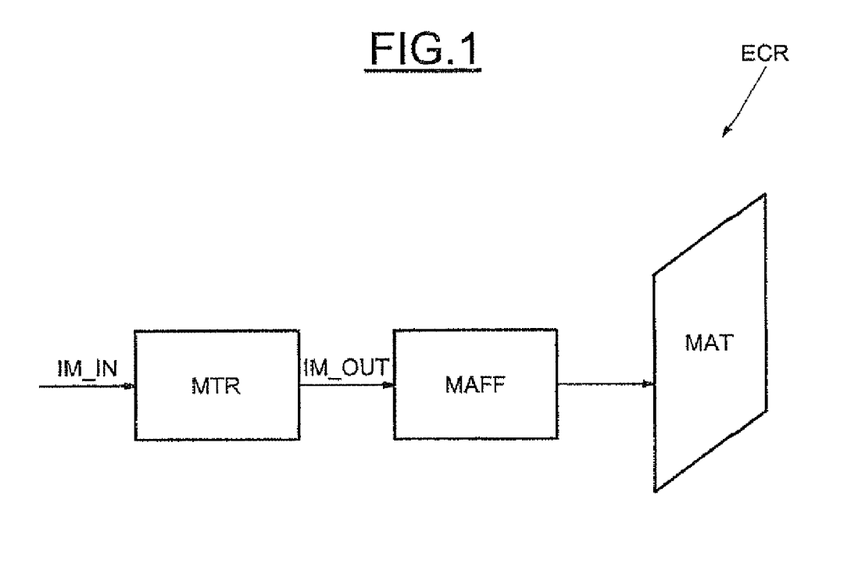
FIG. 1 represents an embodiment of a screen according to the invention.

We refer to FIG. 1 where the reference ECR represents a screen, for example a plasma screen. This screen ECR comprises means of processing MTR of a sampled digital input image IM-TN, and delivers as output a processed digital image IM-OUT. This processed image IM-OUT is delivered to display means or a display MAFF able to adapt the image so as to display it on the display matrix MAT of the screen ECR.

Figure 2:
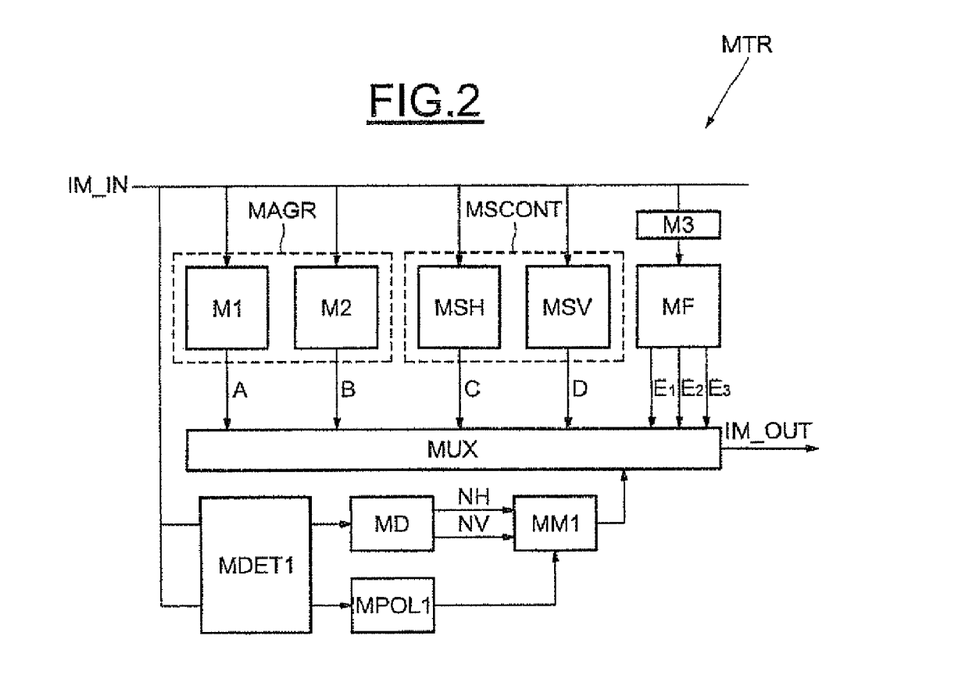
FIG. 2 represents an embodiment of a processing means according to the invention.

We refer now to FIG. 2, which illustrates an embodiment of the processing means or a processor MTR. The processing means MTR comprise in this example, magnifying means or a magnifier MAGR able to perform a magnification of the digital input image IM-IN. However, it is possible to perform any other conventional processing of the image such as an increasing of its resolution, or else the application of a filter of poly-phase type. The magnifying means MAGR receive as input the input image IM-IN and deliver as output a magnified input image.

In this example, the input image IM-IN may be magnified by choice, according to two different magnifying algorithms M1 and M2 which each deliver a magnified image A and B, respectively, according to two different algorithms or procedures. For example, the magnifying algorithms may be an algorithm of bi-linear type or else a piecewise interpolation ("spleen interpolation") algorithm. Of course, the person skilled in the art will be able to use any other magnification procedure or algorithm. The digital input image IM-IN may therefore be magnified according to so many procedures chosen by the user.

The processing means MTR also comprise means of processing of the contours or a contour processor MSCONT. These processing means comprise means of processing of the horizontal contours or a horizontal contour processor MSH and means of processing of the vertical contours MSV. Each of the horizontal and vertical contours may be synthesized by conventional procedures, for example those described in the article: Xin Li, Michael T. Orchard: New edge directed interpolation; IEEE Trans. On Image Processing, Vol. 10, No. 10, pp. 1521-1527, 2001.

However, although it is possible to use any known procedure for magnifying the contours, for example, that described in the aforesaid article, it is preferable to use the procedure described in the patent application filed on the same day as the present patent application in the name of STMicroelectronics SA, and entitled "Procédé de traitement d'une image numérique, en particulier le traitement des zones de contour, et dispositif correspondant" [Method of processing a digital image, in particular the processing of the contour zones, and corresponding device], and which will be described in greater detail hereinbelow.

The processing means MTR may also comprise filtering means or a filter MF able to filter an image previously magnified by means or a second magnifier M3, with the aid for example of a pixel repetition algorithm. By way of example, the filtering means MF may comprise a filter of diamond type used to smooth the magnified image, so as to attenuate the discontinuities engendered by a sampling conventionally performed upstream of the image magnifying step. According to the magnification factor or the size of the contour detected as will be seen hereinafter, the diamond filter may have a suitable dimension.

For example, the diamond filter may be of dimension 3, and then be of the form:

$$\begin{pmatrix} 010 \\ 111 \\ 010 \end{pmatrix} \Big/ 5$$

of dimension 5, and then be of the form:

$$\begin{pmatrix} 00100 \\ 01110 \\ 11111 \\ 01110 \\ 00100 \end{pmatrix} \Big/ 13$$

or else of dimension 7 and then be of the form:

$$\begin{pmatrix} 0001000 \\ 0011100 \\ 0111110 \\ 1111111 \\ 0111110 \\ 0011100 \\ 0001000 \end{pmatrix} \Big/ 25$$

Consequently, the filtering means MF may deliver three images E1, E2 and E3, magnified by repetition of pixels by the means M3 and filtered by a filter of diamond type, respectively of dimension 3, 5 or 7.

Additionally, the processing means MTR comprise detection means or a detector MDET1 able to detect the local minima and maxima in the initial image IM-IN in each dimension considered of the image. For example, for a two-dimensional image, the detection means MDET1 detect the local minima and maxima in the horizontal and vertical direction of the image, that is to say for each line and for each column of the digital image.

The means MDET1 may implement a conventional algorithm or procedure for detecting minimum and maximum, for example that described on the site: "http://fr.wikipedia.org/wiki/Extremum_local". More generally, it is possible to detect these local minima and maxima in n dimensions, be this spatial or temporal. The local minima and maxima detected are delivered to means of determination or a determiner MD able to determine, for each dimension, here horizontal and vertical, of the initial image IM-IN, the size of the contour respectively NH for the horizontal dimension and NV for the vertical dimension. Stated otherwise, the means of calculation count the number of pixels in the interior of the contour considered.

Consequently, the means of determination MD deliver for each pixel of the image and for each dimension, the number of pixels of the contour to which the pixel considered belongs. The values are delivered to means of storage or a storage device MM1 able to store a table in n dimensions (here n=2) wherein are held the algorithms that can be used to generate the pixels of the output image IM-OUT, which is optimal for the width of the contour horizontally on the one hand and vertically on the other.

Figure 3:
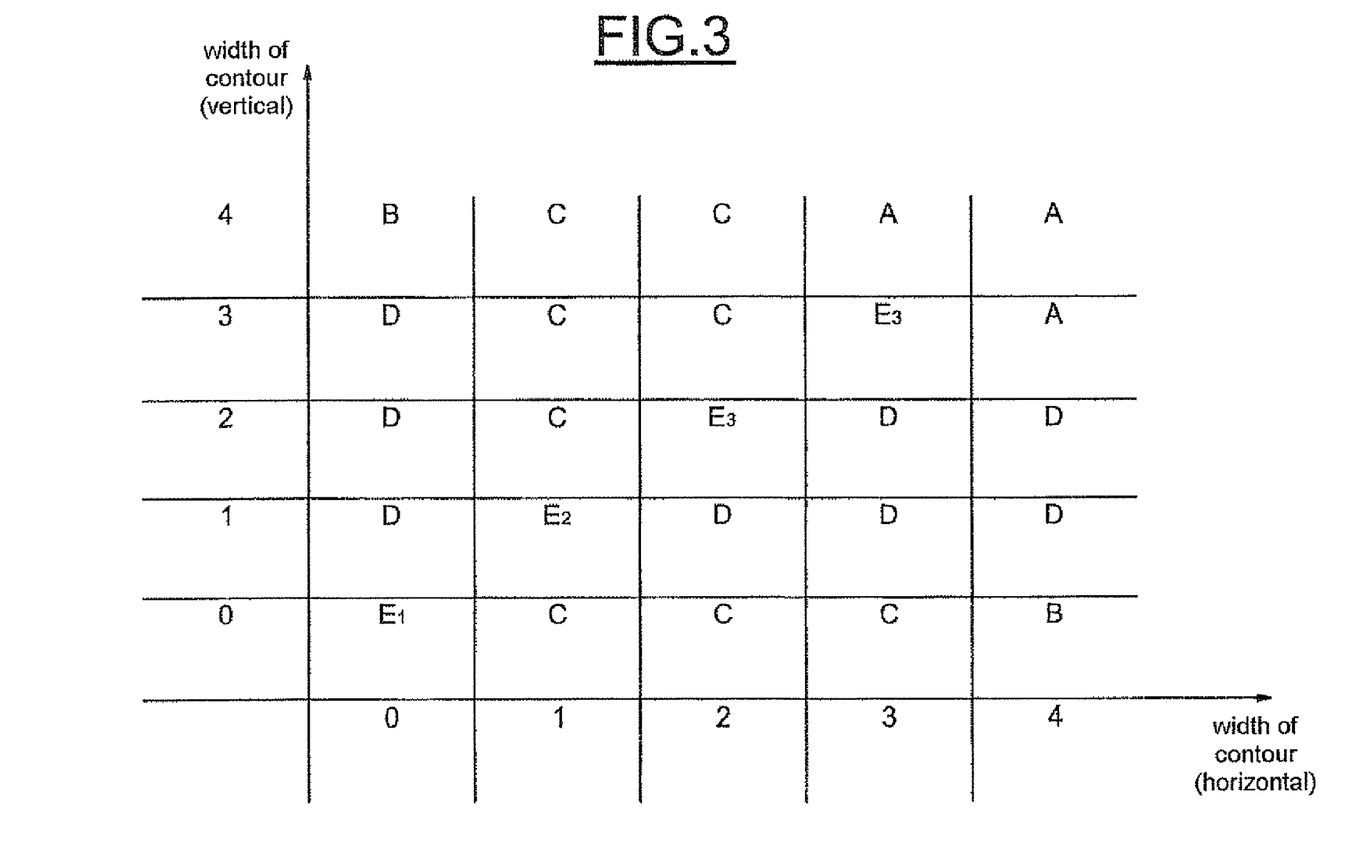
FIG. 3 represents an embodiment of a two-dimensional table used by the embodiment of the means of processing of FIG. 2.

An example of this table is represented in FIG. 3. Represented in the latter are two axes, horizontal and vertical, with the number of pixels that the contour can comprise in each of the dimensions. In this example, the size of the contour is limited to four pixels. Consequently, any contour comprising more than four pixels will be likened to a contour of four pixels. However, it is possible to vary the size of the maximum contour stored by the table (and hence the size of the table stored) as a function of the requirements of the user.

As a function of the number of pixels comprised in the contour horizontally and vertically, the means of storage MM1 deliver the type of algorithm to be used to generate the pixels of the output image corresponding to the pixels of the initial image. For example, if a pixel belongs to a horizontal contour comprising three pixels, and to a vertical contour comprising two pixels, the pixels of the output image that are generated on the basis of this pixel of the input image are so on the basis of the means of processing of the vertical contours MSV.

We refer again to FIG. 2. The processing means MTR comprise means of selection MUX (for example a multiplexer) controlled by the output data of the storage means MM1, and having as many inputs as processing algorithms used, here seven. The means of selection or a selector then deliver the pixels of the output image that are generated according to the optimal procedure stored in the means MM1.

The processing means MTR may also comprise means of polarization or a polarizer MPOL1 able to detect the polarity of a contour, that is to say whether the contour is rising, where one goes from a pixel having a local minimum amplitude to a pixel having a local maximum amplitude, or descending, where one goes from a pixel having a local maximum amplitude to a pixel having a local minimum amplitude. This cue is delivered to the storage means MM1.

Figure 4:
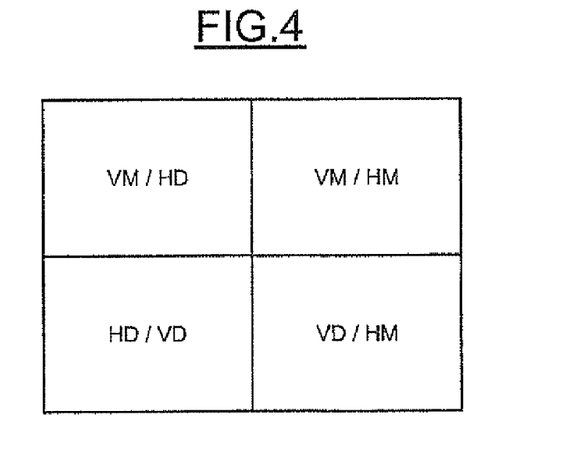
FIG. 4 represents another embodiment of a table used by the embodiment of the processing means.

In this case, the latter store a table of the form of that represented in FIG. 4. This table comprises four quadrants so as to take account of an additional cue, that is to say whether the pixel belongs to a rising contour or to a descending contour, and does so for the horizontal and vertical dimensions. Consequently, the table represented in FIG. 3 is repeated for each quadrant of the table of FIG. 4 and the data are suitably adapted to the polarity of the contour detected by the means MPOL1. Stated otherwise, the algorithm selected may be different if a rising or descending contour is considered.

Figure 5:
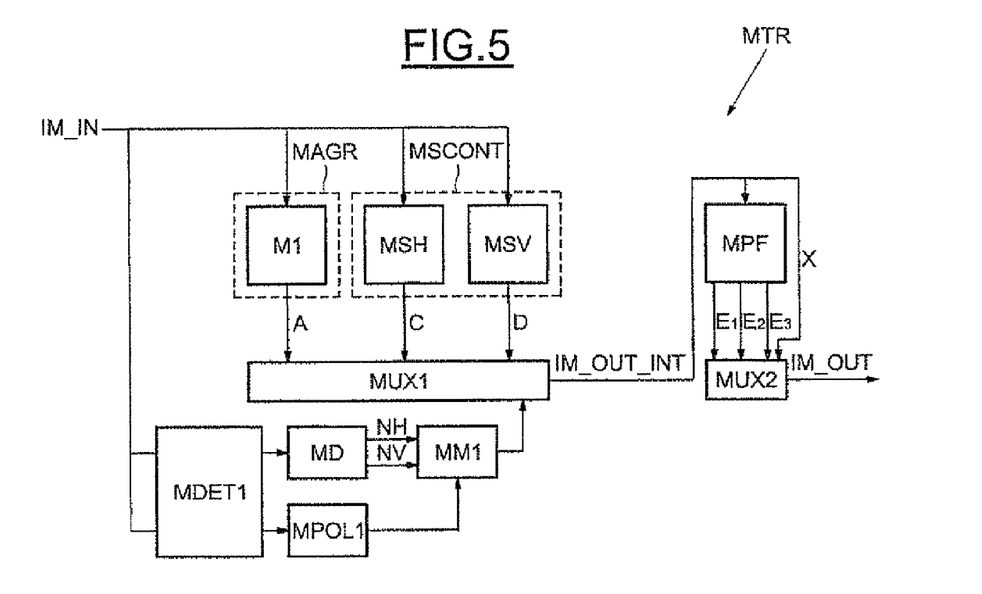
FIG. 5 represents another embodiment of the means of processing according to the invention.

We now refer to FIG. 5, which illustrates another embodiment of the processing means MTR. In this embodiment, the magnifying means MAGR here comprise just a single means M1 able to magnify the input image IM-IN according to a given algorithm. They deliver as output a magnified image B. Just as for the embodiment of FIG. 2, it is possible to choose a magnifying algorithm from a set of algorithms, and the magnified image B and the horizontal and vertical contour images C and D are delivered to means of selection, here a multiplexer MUX1 which delivers as output an intermediate output image IM-OUT-INT. The latter is delivered to post-filtering means MPF able to perform a filtering according to various filters, for example the three diamond filters described hereinabove.

Consequently, the post-filtering means MPF deliver three filtered images E1, E2 and E3 to second means of selection or a second selector, for example a multiplexer MUX2, controlled likewise by the storage means MM. In this case, the storage means MM1 comprise a table of the form of that represented in FIG. 6.

Figure 6:
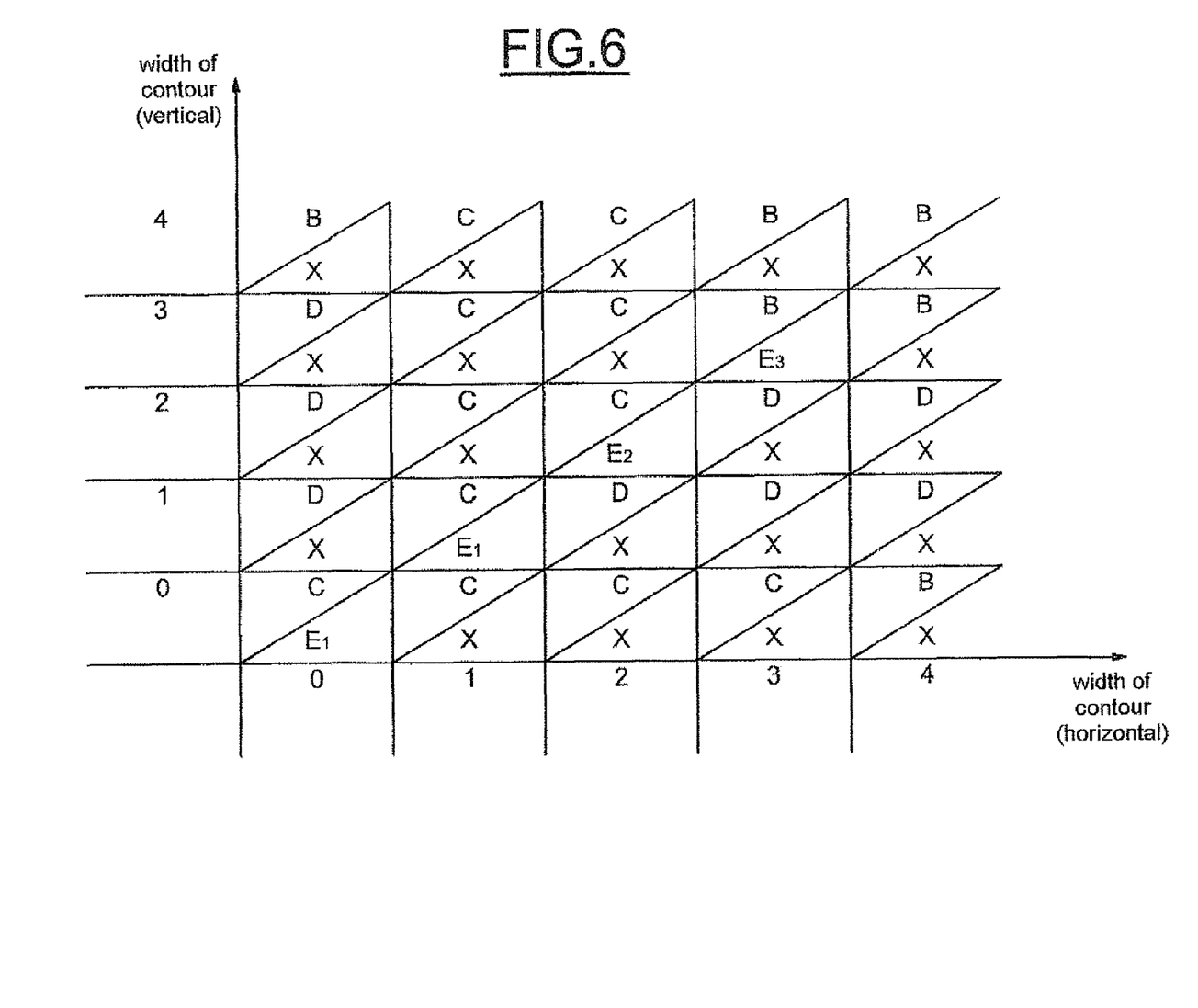
FIG. 6 represents an embodiment of another two-dimensional table used by the means of processing of the embodiment represented in FIG. 5.

The latter comprises cues able to control each of the multiplexers MUX1 and MUX2. Stated otherwise, it is possible to perform the post-filtering also as a function of the size of the contours in the horizontal and vertical direction. In this example, the post-filtering is carried out, for certain sizes of contour, according to the data delivered by the table stored by the means MM1.

Outside of these sizes, the post-filtering means MPF deliver the image IM-OUT-IN directly, referenced X.

We refer again to FIG. 5. Just as for the embodiment of FIG. 2, the processing means MTR may comprise here means MPOL1 able to detect the direction of variation of the contour, rising or descending. The means of selection MUX2 deliver as output the output image IM-OUT. Whether these be the processing means according to the embodiment of FIG. 2 or of FIG. 5, several operational modes are possible. For example, it is possible to calculate magnified images A, B, C, D, E1, E2 and ES together, then to deliver the pixels chosen as a function of the table stored in the storage means MM1 as output.

As a variant, it is possible to determine the pixels of the magnified image according to an algorithm only once the selection of the latter has been performed by the storage means MM1. Stated otherwise, the pixels are generated with a given algorithm only if the latter is selected by the storage means MM1. An other mode of processing of the horizontal and vertical contours will now be described more precisely, as described in the aforesaid patent application entitled: "Procédé de traitement d'une image numérique, en particulier le traitement des zones de contour, et dispositif correspondent". This other application is incorporated with the content of the present application, for all useful purposes. In the rest of the description, unless indicated to the contrary, the main cues which will be mentioned hereinafter are considered to be normalized, that is to say to lie between 0 and 1.

Figure 7:
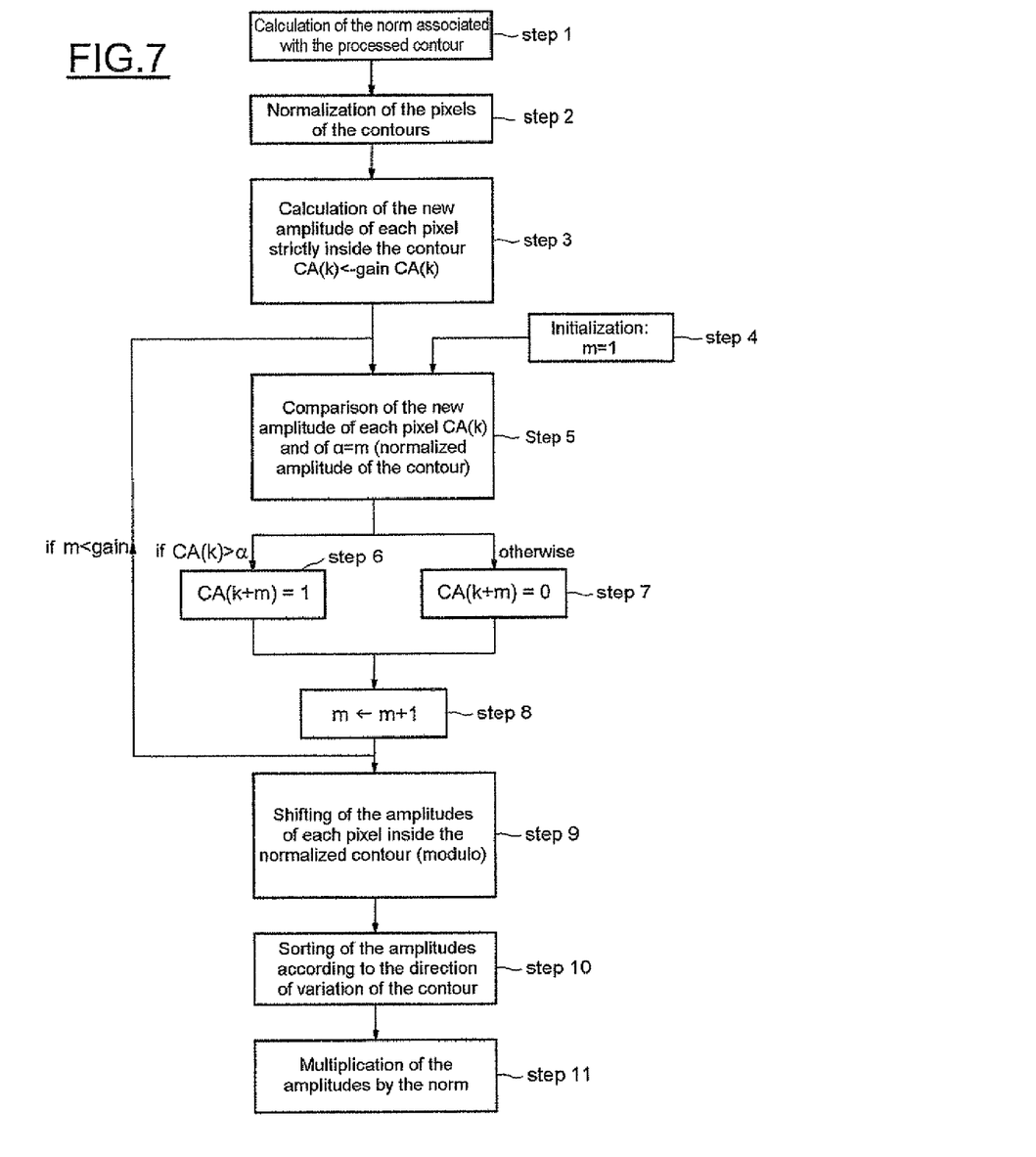
FIG. 7 illustrates a mode of implementation of a preferred method of processing contours according to the invention.

We now refer to FIG. 7 which illustrates a mode of implementation of the method where in this particular case, the magnification of a digital image is performed, or else when the resolution of the image is increased. The magnification may be performed with an integer or non-integer amplifying factor (or gain). Beforehand, for each dimension of the image, the contours of the latter have been detected. A first step (step 1) consists in calculating the norm associated with the contour processed in the chosen dimension. The norm must be recalculated for each contour processed. This norm corresponds to the deviation (main value) between the maximum and minimum amplitudes of the pixels delimiting the contour. This deviation is called the amplitude of the contour.

In the course of a second step (step 2), the pixels of the contours are normalized. This operation amounts, for each pixel of the contour, to subtracting from the amplitude of the pixel, the minimum value of the pixel limiting the contour, and to dividing the result by the norm calculated in step 1.

In the course of a step 3, the new amplitude of each pixel strictly in the interior of the contour is calculated, by multiplying its normalized amplitude by the gain G of the magnification. Next, to obtain sub-pixel amplitudes engendered by the magnification of the image (or the increasing of the resolution), the new amplitude of each pixel $CA(k)$ (k taking successively the value of the index of the pixel processed) is compared (step 5) with a threshold $\alpha$ equal to the amplitude of the normalized contour (that is to say 1, in this case) multiplied by an index m, the latter having been initialized to 1 in the course of a step 4. If the new amplitude of the pixel $CA(k)$ is greater than the threshold $\alpha$, the value 1 is assigned to the sub-pixel (step 6), and 0 is assigned otherwise (step 7).

In the case where a normalized amplitude is not considered, the amplitude of the contour, that is to say (CA(max)−CA(min)), is assigned to CA(k+m). The value of m is incremented (step 8) and steps 5 to 3 are repeated so long as m is strictly less than the gain.

During a step 9, the amplitude, that was amplified in the course of step 3, of each pixel is shifted in such a way that it lies interior to the normalized span (here between 0 and 1). This operation amounts to performing a "modulo" operation on the amplitude $CA(k)$, this being possible owing to the relation between a normalized amplitude and a phase.

Finally, the amplitudes obtained for the whole set of the pixels of the contour and of the sub-pixels are sorted as a function of the direction of variation thereof (step 10). The real amplitudes of each pixel and sub-pixel are retrieved by performing the process inverse to step 2. More precisely, for a rising contour, if CA(in) corresponds to the real amplitude of a pixel at the position n interior to a contour, by performing the normalization operation, we obtain:

$$CA(n1) \leftarrow (CA(\text{in}) - CA(i1))/\text{contour\_contrast}$$

with contour_contrast=abs$(CA(k1)-CA(i1))$ and with n1=(i1+1), . . . , (k1−1), n1 corresponding to the position of a pixel interior to the relevant contour, where, i1<k1, i1 and k1 being two integers corresponding to the positions of the pixels having respectively a minimum and maximum amplitude and delimiting the contour, $CA(i1)$ represents the minimum amplitude of the pixel delimiting the contour, of index i1, $CA(k1)$ represents the maximum amplitude of the pixel delimiting the contour, of index k1.

The width of the contour l is therefore equal to:

$$l=(k1-i1-1), \text{ in terms of number of pixels.}$$

The new amplitude CA' of the pixel of index n1 in the initial image is equal to:

$$CA'(n1*g)=\text{gain}*(CA(n1)-CA(i1));$$

where:

gain represents the amplifying factor, g represents the integer part of the gain, n1*g represents the new index in the processed image of the pixel of index n1 in the initial image.

The amplitude CA" of the sub-pixels which is added by the image processing is determined by the relation:

$$CA''(n1*g+m) = \begin{cases} CA(k1) \text{ if } CA'(n1*g) >= m*(CA(k1)-CA(i1)) \\ CA(i1) \text{ if } CA'(n1*g) < m*(CA(k1)-CA(i1)) \end{cases}$$

with m=1, . . . , (g−1).

The new amplitude CA(n1) that was multiplied by the gain is shifted in such a way that it lies in the normalized deviation, that is to say that a modulo operation, in terms of phase, is applied:

$$CA''(n1*g)=\text{modulo}\{CA'(n1*g),(CA(k1)-CA(i1))\}+CA(i1),$$

where $CA''(n1*g)$ designates the normalized amplitude of the pixel strictly interior to the contour, of index n*g.

The amplitudes of the contours are sorted in ascending order between the minimum and maximum values, so as to obtain for each index the final amplitude CAout:

$$CAout(n1*g+m0)=\text{sort}\{CA''(n1*g+m0)\}\text{asc}$$

with m0=0, 1, . . . , (g−1)

Likewise, for a descending contour, if CA(in) corresponds to the real amplitude of a pixel at the position n interior to a contour, by performing the normalization operation, we obtain:

$$CA(n2) \leftarrow (CA(\text{in}) - CA(k2))/\text{contour\_contrast}$$

with contour_contrast=abs(CA(k2)−CA(i2))
and with n2=(i2+1), . . . , (k2−1), n2 corresponding to the position of a pixel interior to the relevant contour, i2<k2, i2 and k2 being two integers corresponding to the positions of the pixels having respectively a maximum and minimum amplitude and delimiting the contour, CA(k2) designates the minimum amplitude of the pixel delimiting the contour, of index i1, CA(i2) designates the maximum amplitude of the pixel delimiting the contour, of index k1.

The width of the contour l is therefore equal to:

$$l=(k2-i2-1), \text{ in terms of number of pixels.}$$

The new amplitude CA' of the pixel of index n1 in the initial image is equal to:

$$CA'(n2*g)=\text{gain}*(CA(n2)-CA(k2));$$

where:
gain designates the amplifying factor,
g designates the integer part of the gain,
n2*g designates the new index in the processed image of the pixel of index n2 in the initial image.

The amplitude CA" of the sub-pixels which is added by the image processing is determined by the relation:

$$CA''(n2*g+m) = \begin{cases} CA(k2) \text{ if } CA'(n2*g) >= m*(CA(i2)-CA(k2)) \\ CA(i2) \text{ if } CA'(n2*g) < m*(CA(i2)-CA(k2)) \end{cases}$$

with m=1, . . . , (g−1).

The new amplitude CA(n2) is shifted in such a way that it lies in the normalized deviation, that is to say that a modulo operation, in terms of phase, is applied:

$$CA''(n2*g)\text{modulo}\{CA'(n2*g),(CA(i2)-CA(k2))\}+CA(k2),$$

where

CA"(n2*g) designates the normalized amplitude of the pixel strictly interior to the contour, of index n*g.

The amplitudes of the contours are sorted in ascending order between the minimum and maximum values, so as to obtain for each index the final amplitude CAout:

$$CAout(n2*g+m0)=\text{sort}\{CA''(n2*g+m0)\}\text{des}$$

with m0=0, 1, . . . , (g−1).

Figure 8:
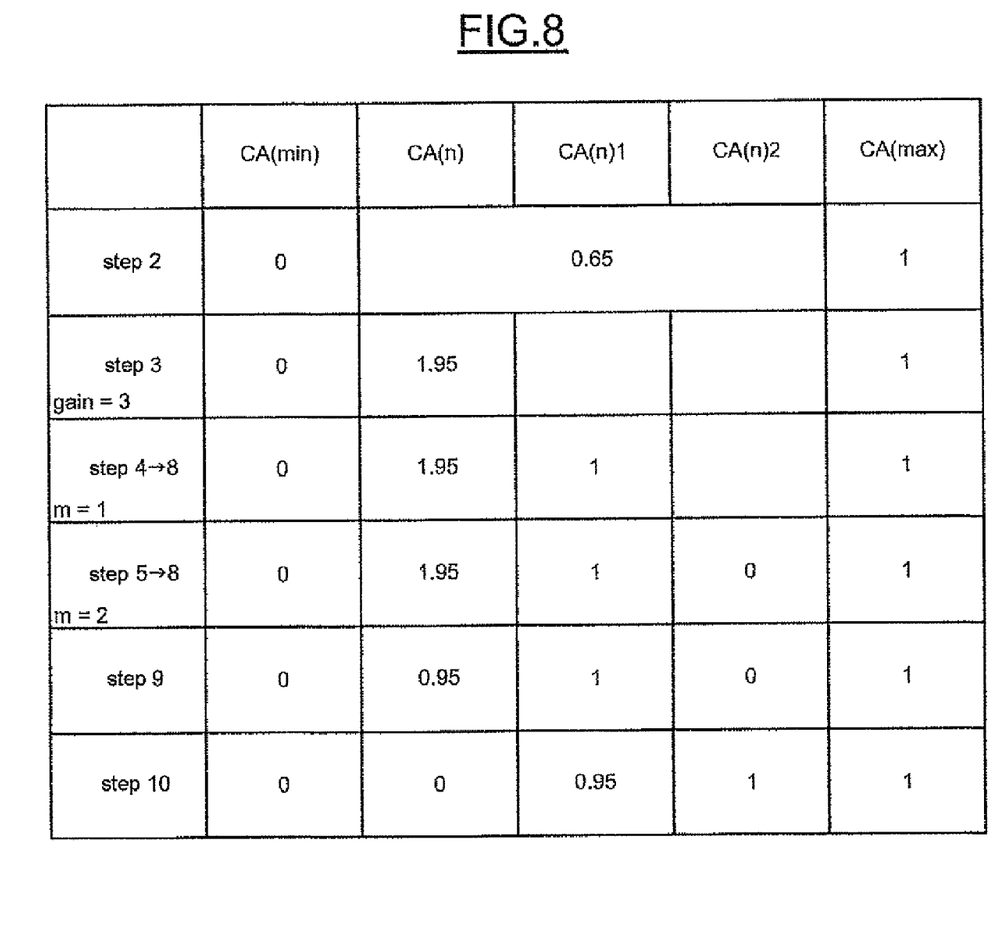
FIGS. 8 and 9 illustrate a numerical application of the mode of implementation of FIG. 7.

We now refer to FIG. 8 which illustrates a numerical example of the embodiment described in FIG. 7.

In this example, a magnification of the image by a gain equal to 3 has been performed. The strict interior of the contour zone here comprises a single pixel, and two sub-pixels will be generated by the magnification.

On completion of the normalization, we are back at step 2 where the amplitudes CA(min), CA(n) and CA(max) are respectively the values 0; 0.65 and 1. For step 3, the amplitude CA(n) is multiplied by the gain, that is to say 3. Its new value is equal to 1.95. Next we proceed to step 5 where the value of m is equal to 1. As 1.95 is greater than 1, the value 1 is assigned to the amplitude CA(n)1 of the first sub-pixel. Next we repeat the same operation with the value m=2. As 1.95 is less than 2, the value 0 is assigned to the amplitude CA(n)2 of the second sub-pixel.

During the ninth step, the Modulo operation is performed where the value 1, that is to say the deviation between CA(max) and CA(min), is deducted from the amplitude CA(n) of the contour pixel, so that its amplitude lies between 0 and 1. Finally, during step 10, the set of normalized amplitudes obtained is sorted, here in increasing order.

Figure 9:
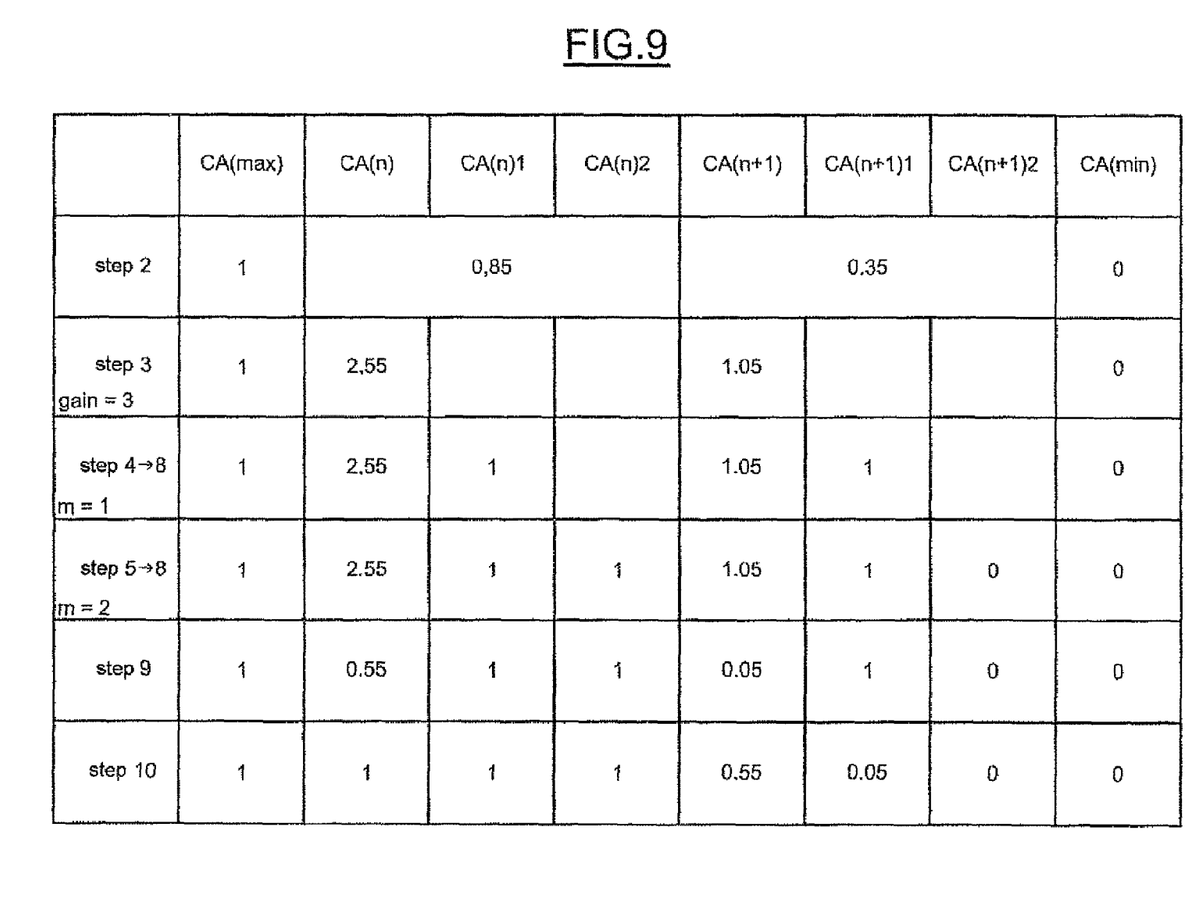

FIG. 9 illustrates exactly the same type of processing, that is to say a magnification by a factor 3, but in the case where initially, the contour comprises two intermediate pixels, here having a normalized amplitude of 0.85 for CA(n) and of 0.35 for CA(n+1) respectively. Two sub-pixels are added by pixels strictly interior to the contour zone, that is to say four sub-pixels in all in this example.

Additionally, a decreasing contour is considered here. Steps 2 to 9 are identical to those described in FIG. 7, but repeated for each of the pixels of the contour zone CA(n) and CA(n+1) Consequently, the sorting step 10 is performed on the whole set of the amplitudes obtained, here six pixels, and in decreasing order, given that a descending contour is considered here.

Figure 10:
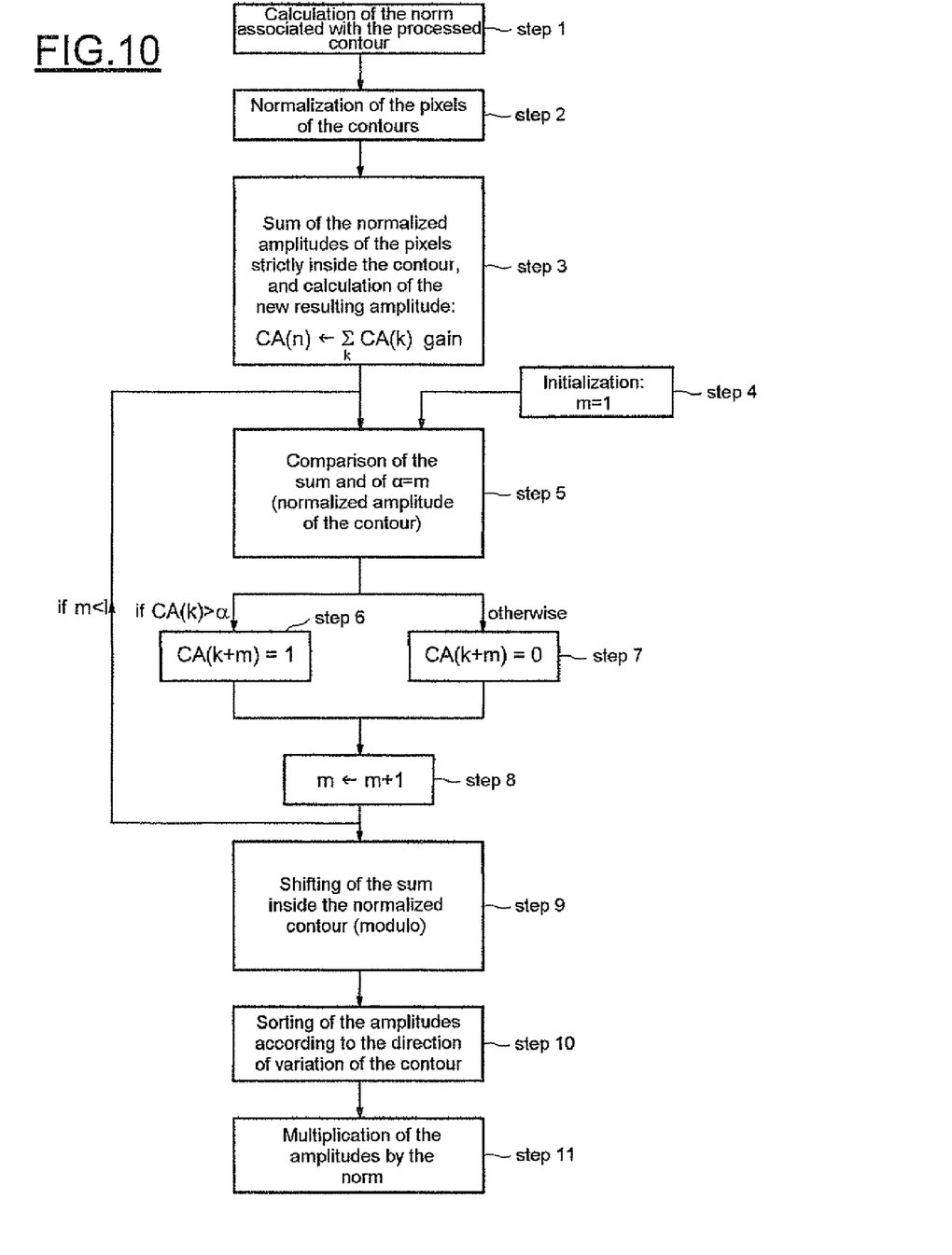
FIG. 10 illustrates another mode of implementation of a method according to the invention.

We now refer to FIG. 50, which illustrates another mode of implementation of a method, especially suitable in the case of an increase, of a decrease or else of a change of resolution of the image. In this embodiment, in the course of step 3, we do not consider each normalized amplitude of the pixels situated strictly interior to the contour zone, but we operate on the sum of these normalized amplitudes. Consequently, the comparison of step 5 is performed with this sum.

Furthermore, the criterion for stopping on completion of step 8 is not the comparison between the index m and the gain but between the index m and the variable 1, which corresponds to the number of pixels strictly interior to the contour on completion of the processing. Additionally, the modulo operation of step 9 is performed on the sum calculated during step 3.

Figure 11:
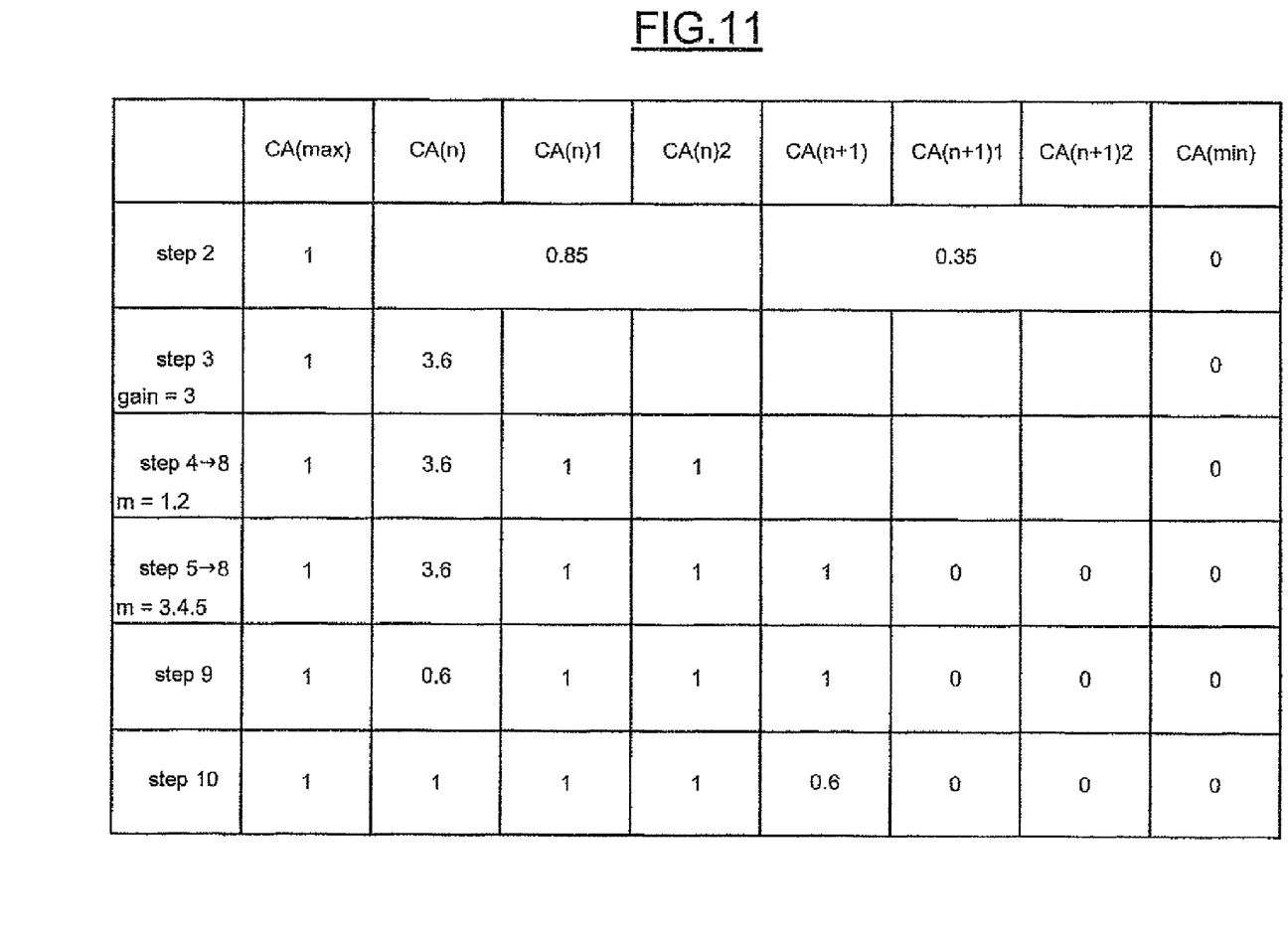
FIGS. 11 and 12 illustrate a numerical application of the mode of implementation of FIG. 10.

We now refer to FIG. 11 which gives a numerical example of the embodiment represented in FIG. 10. Here we consider a descending contour with two intermediate pixels having as normalized amplitudes 0.85 for CA(n) and 0.35 for CA(n+1) respectively.

Once more the processing carried out here is a magnification with a gain of 3, four subpixels are therefore generated for the contour, in addition to the two initial intermediate pixels. Consequently, in the course of step 3, the sum of the amplitudes that is equal to 0.85 and 0.35, the whole multiplied by the gain of 3, is assigned as new amplitude to the pixel CA(n). The resulting amplitude is then equal to 3.6. Next, as already carried out previously, steps 4 to 8 are performed so long as the index m is strictly less than the number of pixels 1 interior to the contour zone.

In the course of step 9, the Modulo operation is performed on the amplitude calculated during step 3, so that the latter is once again normalized, that is to say equal to 0.6 in this case. Finally, the sorting of the set of values obtained is performed in the course of step 10.

Figure 12:
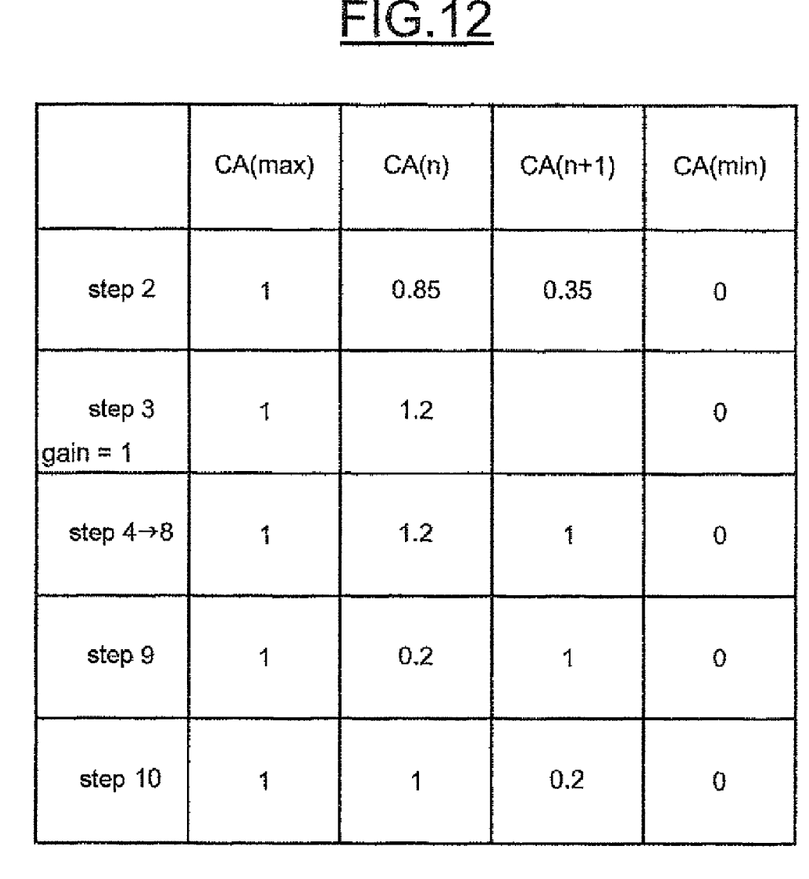

We now refer to FIG. 12, which illustrates a numerical example of the embodiment of FIG. 10, in the particular case where the gain is equal to 1. This example corresponds to a processing of the image where neither the format nor the resolution of the latter is changed. For example, the processing may be that of the effects of blur of a digital image. This numerical example corresponds to a descending contour comprising two intermediate pixels CA(n) and CA(n+1) having as normalized amplitudes the values of 0.85 and 0.35 respectively.

On completion of step 3, the amplitude assigned to CA(n) is equal to 1.2, that is to say the sum of the normalized amplitudes of CA(n) and CA(n+1) in step 2. The comparison performed in the course of steps 4 to 8 makes it possible to assign the value 1 to the pixels having as amplitude CA(n+1). Steps 9 and 10 are performed in the same manner as described previously.

Figure 13:
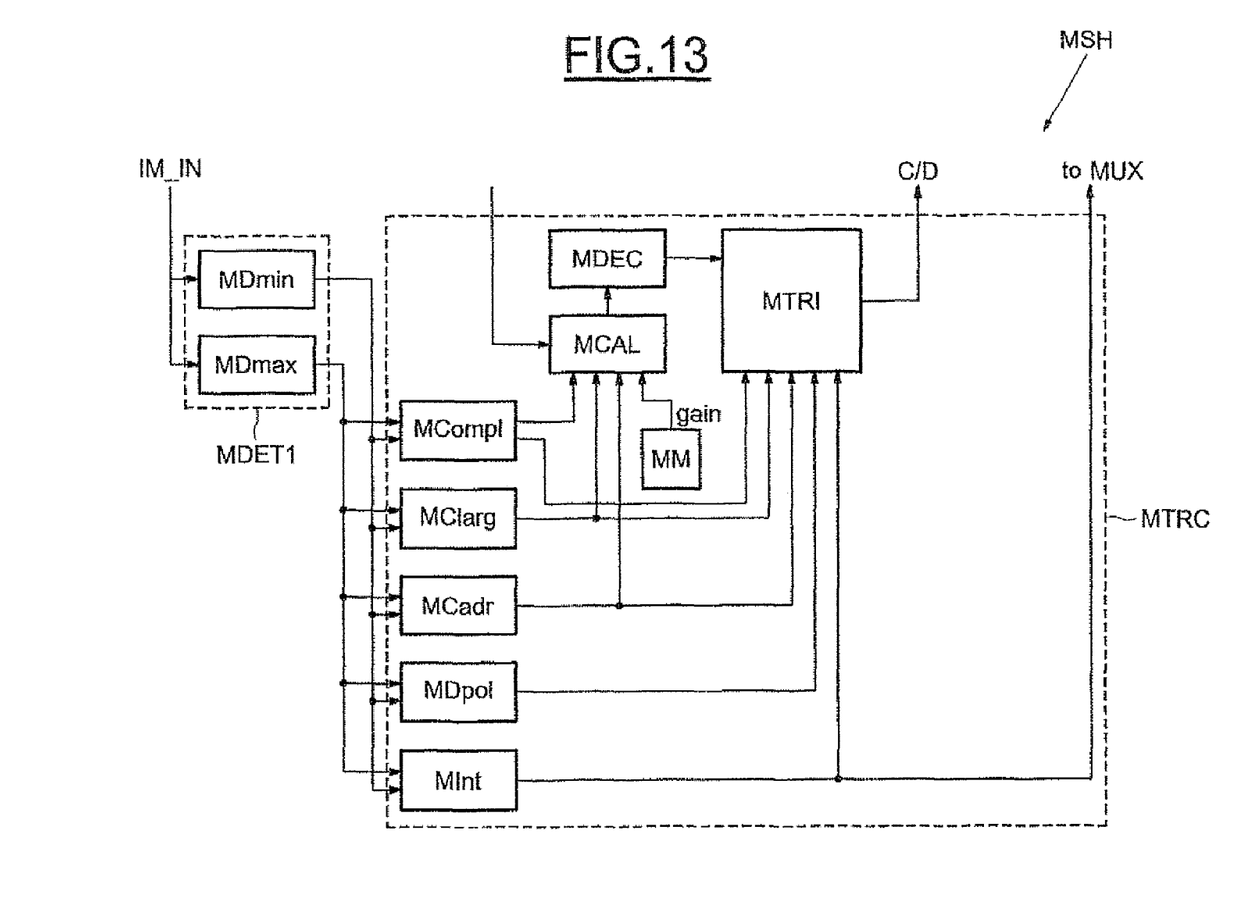
FIG. 13 illustrates more precisely an embodiment of the means of processing of contours according to the invention.

We now refer to FIG. 13. The contour processing means MTRC (corresponding to MTH or MTV) comprise a first block MCampl able to calculate the amplitude of the contour considered on the basis of the minimum and maximum local amplitudes detected by the means MDET. Means Mclarg or a contour size processor are able for their part to calculate the size or width of the contour, that is to say the number of intermediate pixels interior to this contour. Means of addressing or an addresser MCadr store for each contour its location within the input image IM-IN-ech. Finally, means MDpol are able to detect the polarity of the contour, that is to say whether the contour varies from a minimum amplitude to a maximum amplitude (rising contour) or a maximum amplitude to a minimum amplitude (descending contour).

The means of processing of the contours MTRC also comprise means of storage MM able to store the value gain of the amplifying gain. Means of calculation or calculation MCAL implement, on the basis of the data delivered by the means MCampl, MClarg, MCadr and of the amplifying gain, a mode of implementation of the method, for example steps 4 to 8 of the examples illustrated in FIG. 4 or 8.

The new normalized amplitudes are delivered to shifting means or a shifter MDEC able to perform the modulo operations of the amplitudes of contour pixels (step 6 of FIG. 5). The set of amplitudes of the pixels of the contour are delivered to sorting means or a sorter MTRI which rank them as a function of the data delivered by the means MDpol, that is to say whether the contour is rising or descending. The sorting means MTRI also determine the final amplitudes by inverting the normalization operation. The means of processing of the contours may also comprise means of interpolation or an interpolator MInt able to supervise the insertion of the contours in the case where the processing performed by the means MTR comprises the application of a non-integer gain.

That which is claimed:

1. A method of processing an initial digital image having contour zones, comprising:
    magnifying the digital image into a magnified digital image, the magnifying including
        detecting where each contour zone of the digital image is located,
        determining a size, in terms of number of pixels, of each contour zone, and
        magnifying each contour zone using a magnifying software tool, chosen as a function of the size of each contour zone, from among a set of magnifying software tools to perform a contour zone sharpness processing based upon cues regarding level of pixels in each contour zone.

2. The method according to claim 1, wherein the software tool chosen for magnifying each contour zone performs the contour zone sharpness processing including:
    a conversion of cues regarding level of pixels of each contour zone into initial main cues, lying between a minimum value, and a main value dependent on an amplitude of each contour zone;
    a sharpness sub-processing performed on the initial main cues so as to obtain final main cues; and
    a conversion of the final main cues into final cues regarding levels.

3. The method according to claim 1, further comprising post-filtering of each contour zone of the magnified digital image, according to a post-filtering software tool, chosen as a function of dimensions of each contour zone.

4. The method according to claim 3, wherein a direction of variation of the pixels of each contour zone is detected, and the post-filtering software tool is chosen as a function of the direction of variation.

5. The method according to claim 1, wherein a direction of variation of the pixels of each contour zone is detected, and the magnifying software tool is chosen as a function of the direction of variation.

6. The method according to claim 1, wherein determining the size of each contour zone is determined according to a plurality of dimensions.

7. The method according to claim 1, wherein determining the size of each contour zone is determined according to two dimensions, respectively according to a horizontal axis and a vertical axis.

8. The method according to claim 1, further comprising displaying the magnified digital image on a screen.

9. The method according to claim 8, wherein the screen comprises a plasma screen.

10. A method of processing an initial digital image having contour zones, comprising:
    magnifying the digital image into a magnified digital image, the magnifying including
        detecting where each contour zone of the digital image is located,
        determining a size, in terms of number of pixels, of each contour zone, and
        magnifying each contour zone using a magnifying software tool, chosen as a function of the size of each contour zone, to perform a contour zone sharpness processing based upon cues regarding level of pixels in each contour zone; and
    post-filtering of each contour zone of the magnified digital image, according to a post-filtering software tool.

11. The method according to claim 10, wherein the software tool chosen for magnifying each contour zone performs the contour zone sharpness processing including:
    a conversion of cues regarding level of pixels of each contour zone into initial main cues, lying between a minimum value, and a main value dependent on an amplitude of each contour zone,
    a sharpness sub-processing performed on the initial main cues so as to obtain final main cues, and
    a conversion of the final main cues into final cues regarding levels.

12. The method according to claim 10, wherein determining the size of each contour zone is determined according to a plurality of dimensions.

13. The method according to claim 10, wherein the post-filtering software tool is chosen as a function of dimensions of each contour zone.

14. The method according to claim 10, wherein the magnifying software tool is chosen from a set of magnifying software tools.

15. The method according to claim 10, wherein a direction of variation of the pixels of each contour zone is detected, and the post-filtering software tool is chosen as a function of the direction of variation.

16. The method according to claim 10, wherein a direction of variation of the pixels of each contour zone is detected, and the magnifying software tool is chosen as a function of the direction of variation.

17. A device for processing an initial digital image comprising at least one contour zone, the device comprising:
- a detector to detect each contour zone of the digital image;
- a determiner to determine size, in terms of number of pixels, of each contour zone; and
- a magnifier to magnify each contour zone with aid of a magnifying software tool, chosen as a function of the size of each contour zone, from among a set of magnifying software tools to perform a contour zone sharpness processing based upon cues regarding level of pixels in each contour zone.

18. The device according to claim 17, wherein said magnifier comprises:
- a sharpness processor including
  - a first converter configured to convert cues regarding level of pixels of each contour zone into initial main cues, lying between a minimum value and a main value dependent on an amplitude of each contour zone,
  - a sharpness sub-processor configured to perform a sharpness processing on the initial main cues so as to obtain final main cues, and
  - a second converter configured to convert the final main cues into final cues regarding levels.

19. The device according to claim 17, further comprising a plasma screen coupled to said magnifier.

20. A method of processing an initial digital image having contour zones, comprising:
- magnifying the digital image into a magnified digital image, the magnifying including
  - detecting where each contour zone of the digital image is located,
  - determining a size, in terms of number of pixels, of each contour zone, and
  - magnifying each contour zone using a magnifying software tool, chosen as a function of the size of each contour zone, from among a set of magnifying software tools, the software tool performs a contour zone sharpness processing including
    - a conversion of cues regarding level of pixels of each contour zone into initial main cues, lying between a minimum value, and a main value dependent on an amplitude of each contour zone,
    - a sharpness sub-processing performed on the initial main cues so as to obtain final main cues, and
    - a conversion of the final main cues into final cues regarding levels.

21. A device for processing an initial digital image comprising at least one contour zone, the device comprising:
- a detector to detect each contour zone of the digital image;
- a determiner to determine size, in terms of number of pixels, of each contour zone; and
- a magnifier to magnify each contour zone with aid of a magnifying software tool, chosen as a function of the size of each contour zone, from among a set of magnifying software tools and comprising
- a sharpness processor including
  - a first converter configured to convert cues regarding level of pixels of each contour zone into initial main cues, lying between a minimum value and a main value dependent on an amplitude of each contour zone,
  - a sharpness sub-processor configured to perform a sharpness processing on the initial main cues so as to obtain final main cues, and
  - a second converter configured to convert the final main cues into final cues regarding levels.

* * * * *

UNITED STATES PATENT AND TRADEMARK OFFICE
CERTIFICATE OF CORRECTION

| | |
|---|---|
| PATENT NO. | : 7,860,338 B2 |
| APPLICATION NO. | : 11/623504 |
| DATED | : December 28, 2010 |
| INVENTOR(S) | : Lebowsky et al. |

It is certified that error appears in the above-identified patent and that said Letters Patent is hereby corrected as shown below:

Column 4, Line 8
Delete: "IM-TN"
Insert: --IM-IN--

Column 7, Line 16
Delete: "ES"
Insert: --E3--

Column 7, Line 24
Delete: "An other"
Insert: --Another--

Column 8, Line 2
Delete: "3"
Insert: --8--

Column 9, Line 49
Delete: "*(n2\*g)modulo*"
Insert: --*(n2\*g)=modulo*--

Column 10, Line 25
Delete: "(n+1) Consequently,"
Insert: --(n+1). Consequently,--

Signed and Sealed this
Twelfth Day of July, 2011

David J. Kappos
*Director of the United States Patent and Trademark Office*